United States Patent
Kang (10) Patent No.: US 9,091,814 B2
(45) Date of Patent: Jul. 28, 2015

(54) OPTICAL UNIT AND DISPLAY DEVICE HAVING THE SAME

(75) Inventor: Sung-Ku Kang, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 316 days.

(21) Appl. No.: 13/423,775

(22) Filed: Mar. 19, 2012

(65) Prior Publication Data

US 2013/0127742 A1 May 23, 2013

(30) Foreign Application Priority Data

Nov. 17, 2011 (KR) .................. 10-2011-0120471

(51) Int. Cl.
| | | |
|---|---|---|
| G06F 3/041 | (2006.01) | |
| G02B 27/28 | (2006.01) | |
| F21V 9/14 | (2006.01) | |
| G02B 5/30 | (2006.01) | |
| G06F 3/044 | (2006.01) | |
| G06F 3/045 | (2006.01) | |

(52) U.S. Cl.
CPC .............. *G02B 5/3025* (2013.01); *G06F 3/044* (2013.01); *G06F 3/045* (2013.01)

(58) Field of Classification Search
CPC ............ G09G 5/00; G09G 5/36; G06F 3/042; G06F 3/045; G06F 3/038
USPC .......................................... 345/32, 173–175
See application file for complete search history.

(56) References Cited

U.S. PATENT DOCUMENTS

| | | |
|---|---|---|
| 5,537,144 A | 7/1996 | Faris |
| 5,548,422 A | 8/1996 | Conner et al. |
| 6,359,664 B1 | 3/2002 | Faris |
| 6,515,785 B1 | 2/2003 | Cobb, Jr. et al. |
| 6,829,071 B2 | 12/2004 | Allen et al. |
| 6,934,082 B2 | 8/2005 | Allen et al. |
| 7,349,043 B2 * | 3/2008 | Sumiyoshi et al. ............. 349/64 |
| 7,436,393 B2 | 10/2008 | Hong et al. |
| 2004/0104899 A1 | 6/2004 | Hong et al. |
| 2005/0052738 A1 | 3/2005 | Perlin et al. |
| 2007/0040796 A1 | 2/2007 | Lee |
| 2008/0106672 A1 | 5/2008 | Kim et al. |
| 2008/0225389 A1 | 9/2008 | Oh et al. |
| 2008/0258614 A1 | 10/2008 | Ha et al. |
| 2008/0268182 A1 | 10/2008 | Kye et al. |
| 2010/0045705 A1* | 2/2010 | Vertegaal et al. ............. 345/173 |
| 2010/0134448 A1* | 6/2010 | Park et al. .................... 345/176 |
| 2010/0157177 A1 | 6/2010 | Park et al. |
| 2011/0043486 A1* | 2/2011 | Hagiwara et al. ............. 345/175 |
| 2011/0050612 A1 | 3/2011 | Matsumoto et al. |
| 2011/0085113 A1 | 4/2011 | Kim et al. |
| 2011/0085123 A1 | 4/2011 | Kim et al. |
| 2011/0234079 A1 | 9/2011 | Eom et al. |
| 2011/0249223 A1 | 10/2011 | Suh et al. |

FOREIGN PATENT DOCUMENTS

| | | |
|---|---|---|
| KR | 10-2010-0051142 | 5/2010 |
| KR | 10-2010-0063292 | 6/2010 |
| KR | 10-2010-0084252 | 7/2010 |

* cited by examiner

*Primary Examiner* — Andrew Sasinowski (74) *Attorney, Agent, or Firm* — Robert E. Bushnell, Esq.

(57) ABSTRACT

An optical unit is positioned on a display panel which includes a display area displaying an image and a non-display area adjacent to the display area. The optical unit includes: a polarizing plate, positioned on the display panel so as to correspond to the display area and the non-display area, for polarizing light passing therethrough; and a decoration layer positioned adjacent to the polarizing plate so as to correspond to the non-display area for blocking light.

20 Claims, 6 Drawing Sheets

OPTICAL UNIT AND DISPLAY DEVICE HAVING THE SAME

CLAIM OF PRIORITY

This application makes reference to, incorporates the same herein, and claims all benefits accruing under 35 U.S.C. §119 from an application earlier filed in the Korean Intellectual Property Office on the 17 of Nov. 2011 and there duly assigned Serial No. 10-2011-0120471.

BACKGROUND OF THE INVENTION

1. Field of the Invention

The present invention relates to an optical unit and a display device having the same, and more particularly, to an optical unit including a polarizing plate and a display device having the same.

2. Description of the Related Art

A display device is a device for displaying images, and recently, a display device including an organic light emitting diode (OLED) has come to prominence.

Unlike a liquid crystal display (LCD), the OLED has the characteristics of self-emission and does not require a light source so that the thickness and weight of the overall display device can be reduced to enhance flexible characteristics of the display device. The OLED exhibits high quality characteristics such as low power consumption, high luminance, and a high response speed.

In general, a display device includes a display panel for displaying an image, an optical unit disposed on the display panel and including a polarizing plate, and a window including a decoration layer disposed on the optical unit for protecting the optical unit and for blocking light that passes through an outer edge area.

However, since the display device of the related art includes the window, the overall thickness of the display device is increased. Thus, although the display device has flexible characteristics, the flexible characteristics thereof are degraded due to the presence of the window.

The above information disclosed in this Background section is only for enhancement of an understanding of the background of the invention, and therefore it may contain information that does not form the prior art that is already known in this country to a person of ordinary skill in the art.

SUMMARY OF THE INVENTION

The present invention has been developed in an effort to provide an optical unit having advantages of enhancing flexible characteristics of a display device by reducing the overall thickness of the display device, and a display device having the same.

An exemplary embodiment of the present invention provides an optical unit positioned on a display panel including a display area for displaying an image and a non-display area adjacent to the display area. The optical unit includes: a polarizing plate positioned on the display panel so as to correspond to the display area and the non-display area and polarizing light passing therethrough; and a decoration layer positioned adjacent to the polarizing plate so as to correspond to the non-display area and blocking light.

The decoration layer may be positioned between the polarizing plate and the display panel.

The optical unit may further include a phase retardation plate positioned between the polarizing plate and the decoration layer.

The polarizing plate may linearly polarize light, and the phase retardation plate may retard the phase of light by $\lambda/4$.

The decoration layer may be formed on the phase retardation plate.

The optical unit may further include a protective layer positioned on the polarizing plate, wherein the decoration layer may be positioned between the protective layer and the polarizing plate.

The decoration layer may be formed on the protective layer.

The optical unit may further include a phase retardation plate positioned between the polarizing plate and the display panel.

Another embodiment of the present invention provides a display device comprising: a flexible display panel including a display area for displaying an image and a non-display area adjacent to the display area; and an optical unit having the foregoing characteristics, and having the form of a film.

The display device may further include a touch panel positioned between the display panel and the optical unit.

The display panel may include an organic light emitting element.

According to an embodiment of the present invention, the optical unit enhances the flexible characteristics of a display device by reducing the overall thickness of the display device, and a display device including the same is provided.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

The present invention will be described more fully hereinafter with reference to the accompanying drawings, in which exemplary embodiments of the invention are shown. As those skilled in the art will realize, the described embodiments may be modified in various different ways, all without departing from the spirit or scope of the present invention.

In order to clarify the present invention, parts that are not connected with the description will be omitted, and the same elements or equivalents are referred to by the same reference numerals throughout the specification.

In several embodiments, the same reference numerals are used for elements having the same configuration so as to representatively explain the elements in a first embodiment, and only a different configuration from that of the first embodiment will be described in other embodiments.

The size and thickness of each element are arbitrarily shown in the drawings, and the present invention is not necessarily limited thereto.

In the drawings, the thickness of several layers and regions are magnified for clarification. In the drawings, the thickness of some of layers and regions are exaggerated for the sake of explanation. It will be understood that, when an element such as a layer, film, region, or plate is referred to as being "on" another element, it can be directly on the other element or intervening elements may also be present.

Throughout the specification, unless explicitly described to the contrary, the word "comprise", and variations such as "comprises" or "comprising", will be understood to imply the inclusion of stated elements but not the exclusion of any other elements. Also, throughout the specification, "on" means that an element is positioned on or above or under or below another element, and may not necessarily mean that an element is positioned at an upper side of another element based on a gravitation direction.

A display device according to a first embodiment of the present invention will now be described with reference to FIGS. 1 through 4.

Figure 1:
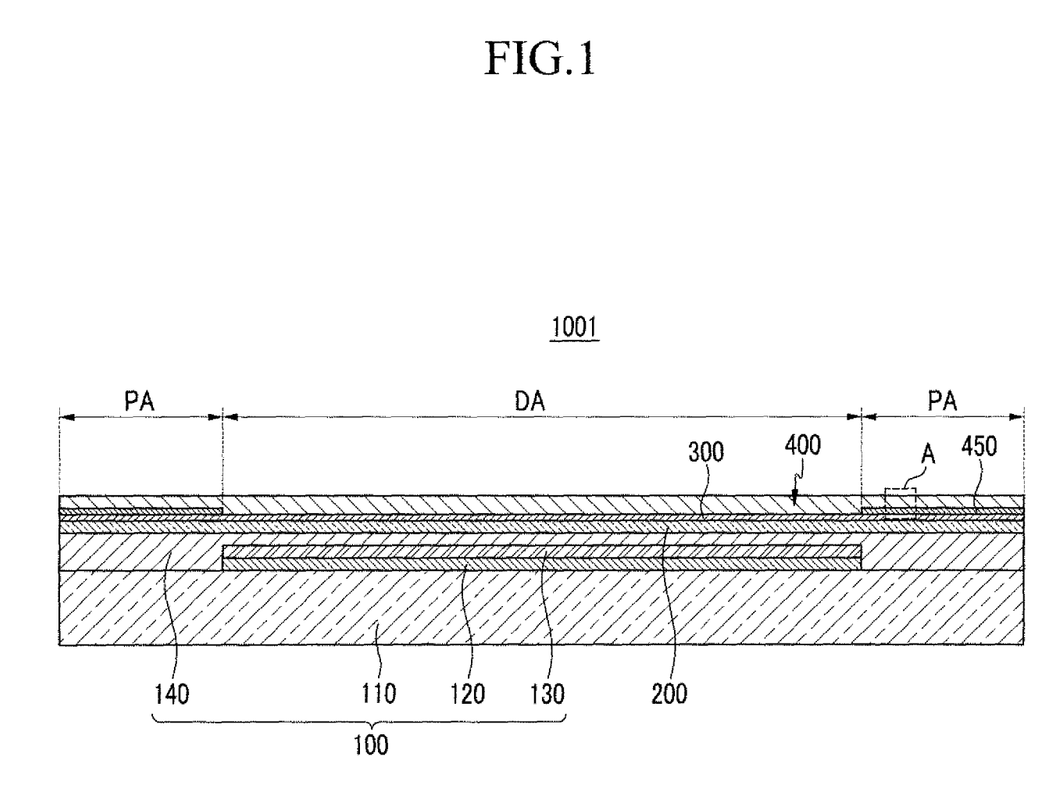
FIG. 1 is a cross-sectional view of a display device according to a first embodiment of the present invention.

FIG. 1 is a cross-sectional view of a display device according to a first embodiment of the present invention.

As shown in FIG. 1, a display device 1001 according to a first embodiment of the present invention includes a display panel 100, a touch panel 200, an adhesive layer 300, and an optical unit 400.

The display panel 100 includes a display area DA for displaying an image and a non-display area PA adjacent to the display area DA. The display panel 100 has flexible characteristics, and includes a substrate 110, a wiring unit 120, an organic light emitting element 130, and an encapsulation layer 140.

The substrate 110 includes polymer, quartz, glass, metal, or the like, and is made of a light-transmissive material. The wiring unit 120 and the organic light emitting element 130 are disposed on the substrate 110, and the substrate 110 faces the encapsulation layer 140 with the wiring unit 120 and the organic light emitting element 130 interposed therebetween. The substrate 110 and the encapsulation layer 140 are attached, and are hermetically sealed to protect the wiring unit 120 and the organic light emitting element 130, respectively.

The wiring unit 120 includes first and second TFTs 10 and 20 (See FIG. 2), respectively, and transfers a signal to the organic light emitting element 130 so as to drive the organic light emitting element 130. The organic light emitting element 130 emits light according to the signal received from the wiring unit 120.

The organic light emitting element 130 is disposed on the wiring unit 120.

The organic light emitting element 130 is disposed on the substrate, receives the signal from the wiring unit 120, and displays an image according to the received signal.

An internal structure of the display panel 100 included in the display device 1001 according to the first embodiment of the present invention will now be described in detail with reference to FIGS. 2 and 3.

Figure 2:
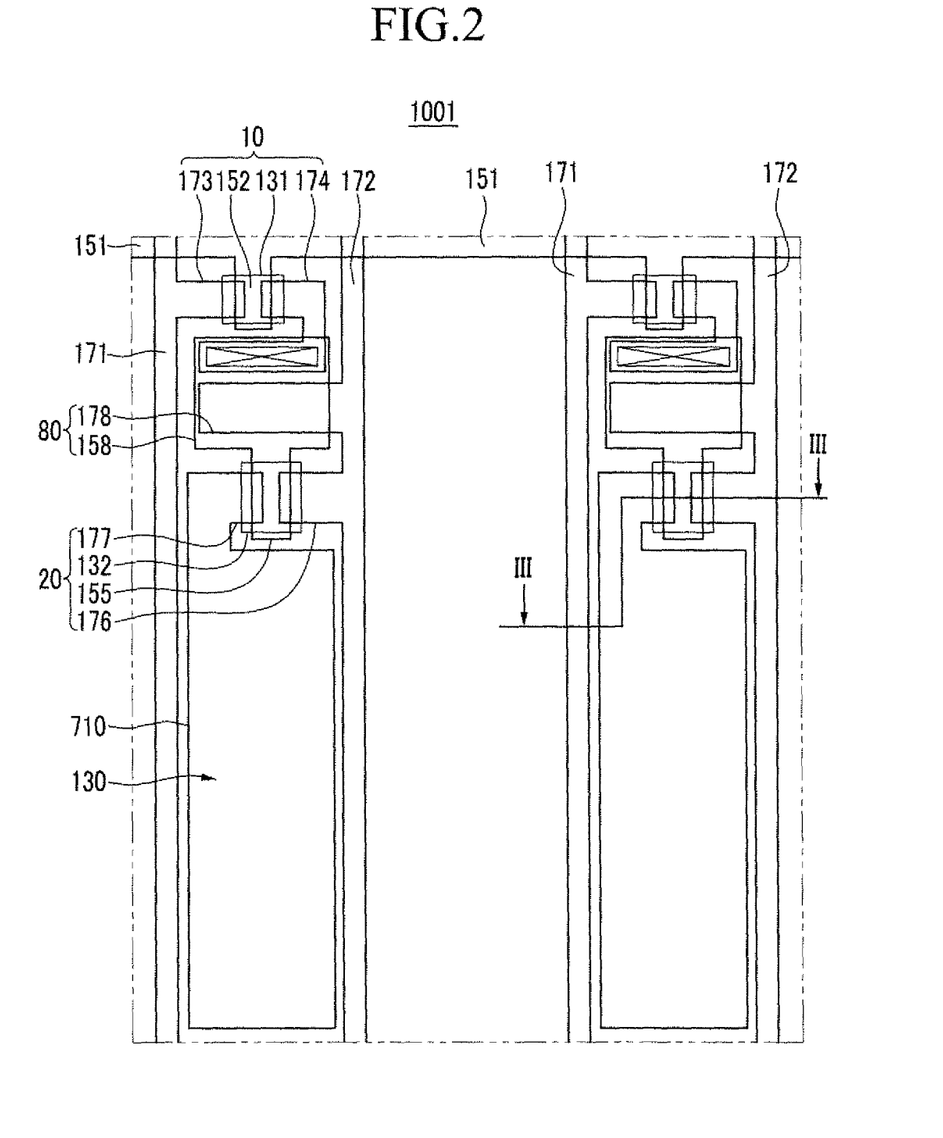
FIG. 2 is a layout view showing the structure of pixels of a display panel included in the display device according to the first embodiment of the present invention.
Figure 3:
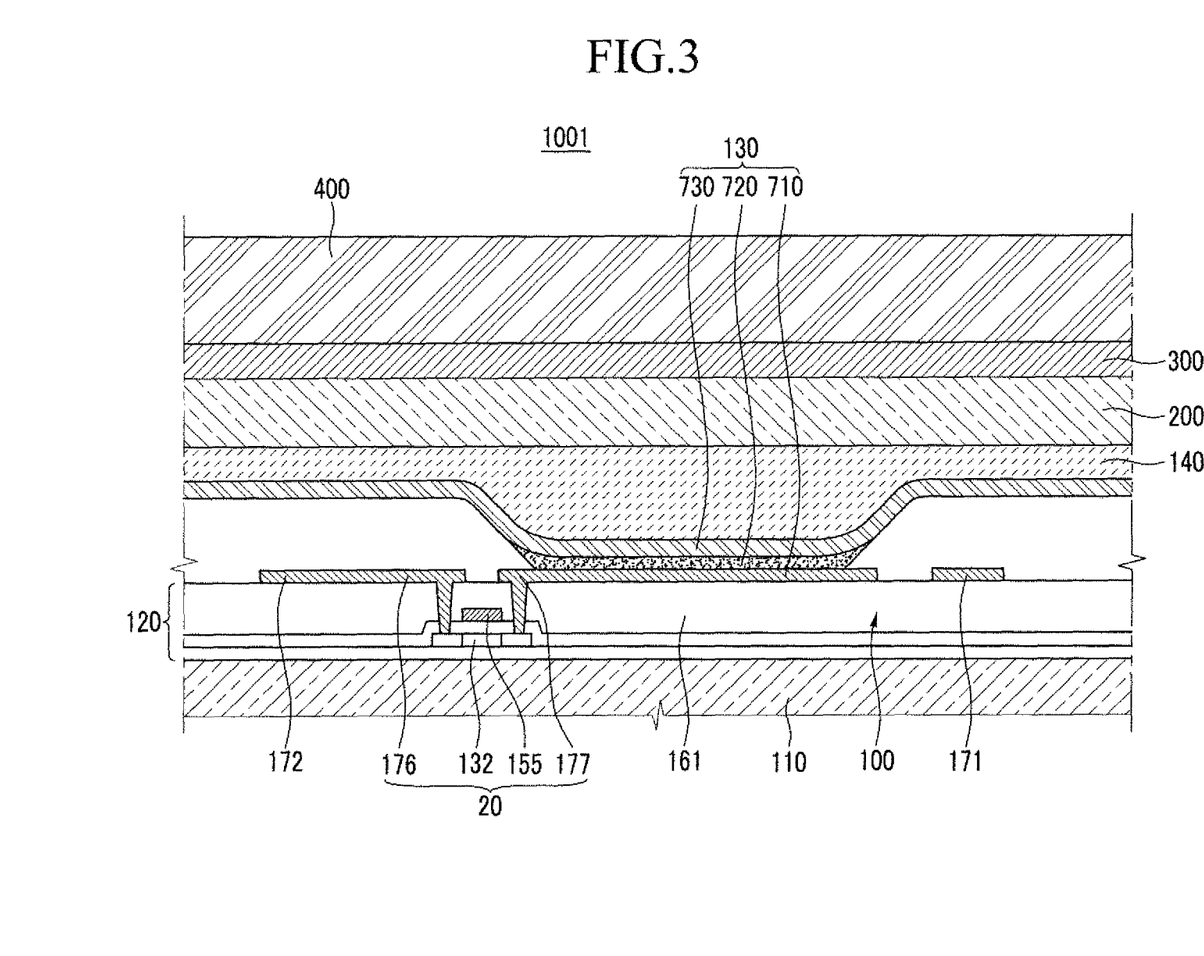
FIG. 3 is a cross-sectional view taken along line III-III in FIG. 2.

FIG. 2 is a layout view showing the structure of pixels of a display panel included in the display device according to the first embodiment of the present invention, and FIG. 3 is a cross-sectional view taken along line III-III in FIG. 2.

Detailed structures of the wiring unit 120 and the organic light emitting element 130 are illustrated in FIGS. 2 and 3, but the embodiment of the present invention is not limited to the structure illustrated in FIGS. 2 and 3. The wiring unit 120 and the organic light emitting element 130 may be formed so as to have various structures within a scope in which a person skilled in the art can easily modify them. For example, the attached drawings illustrate an active matrix (AM) display device having a 2Tr-1Cap structure in which a pixel has two TFTs and one capacitor, but the present invention is not limited thereto. Thus, the display device is not limited to the number of the TFTs, the number of the storage capacitors, and the number of wirings. Meanwhile, pixel refers to a minimum unit for displaying an image, and the display device displays an image by using a plurality of pixels.

As shown in FIGS. 2 and 3, the display panel 100 includes a switching TFT 10, a driving TFT 20, a storage capacitor 80, and the organic light emitting element 130 formed in each pixel. Here, the configuration including the switching TFT 10, the driving TFT 20, and the storage capacitor 80 is called the wiring unit 120 (see FIG. 3). The wiring unit 120 further includes a gate line 151 (FIG. 2) disposed in one direction of the substrate 110, and a data line 171 and a common power line 172 crossing the gate line 151 in an insulative manner (FIGS. 2 and 3). Here, one pixel may be defined by the gate line 151, the data line 171, and the common line 172 as a boundary, but the present invention is not necessarily limited thereto.

The organic light emitting element 130 includes a first electrode 710, an organic light emitting layer 720 formed on the first electrode 720, and a second electrode 730 formed on the organic light emitting layer 720 (see FIG. 3). The first electrode 710, the organic light emitting layer 720, and the second electrode 730 constitute the organic light emitting element 130. Here, the first electrode 710 forms an anode as a hole injection electrode, and the second electrode 730 forms a cathode as an electron injection electrode. However, the first embodiment of the present invention is not necessarily limited thereto, and the first electrode 710 may be a cathode and the second electrode 730 may be an anode according to the driving method of the display device. Holes and electrons are injected from the first electrode 710 and the second electrode 730 into the organic light emitting layer 720, and when exitons formed as the holes and electrons injected into the organic light emitting layer 720 are combined and change from an excited state to a base state, the organic light emitting layer 720 emits light. Also, the first electrode 710 has a light-reflective structure, and the second electrode 730 has a light-transmissive structure. Accordingly, the organic light emitting element 130 emits light toward the optical unit 400.

The storage capacitor 80 includes a pair of capacitor plates 158 and 178 (FIG. 2) disposed with an interlayer insulating layer 161 (FIG. 3) interposed therebetween. Here, the interlayer insulating layer 161 forms a dielectric material, and the capacitance of the storage capacitor 80 is determined by electric charges charged in the storage capacitor 80 and the voltage between the two capacitor plates 158 and 178.

The switching TFT 10 includes a switching semiconductor layer 131, a switching gate electrode 152, a switching source electrode 173, and a switching drain electrode 174 (FIG. 2). The driving TFT 20 includes a driving semiconductor layer 132, a driving gate electrode 155, a driving source electrode 176, and a driving drain electrode 177.

The switching TFT 10 is used as a switching element for selecting pixels desired to be illuminated. The switching gate electrode 152 is connected to the gate line 151. The switching source electrode 173 is connected to the data line 171. The switching drain electrode 174 is disposed so as to be spaced apart from the switching source electrode 173, and is connected to one capacitor plate 158.

The driving TFT 20 applies driving power for making the organic light emitting layer 720 of the organic light emitting element 130, within a selected pixel emit light directed to the second electrode 730. The driving gate electrode 155 is connected to the capacitor plate 158 which is connected to the switching drain electrode 174. The driving source electrode 176 and the other capacitor plate 178 are connected to the common power line 172, respectively. The driving drain electrode 177 is disposed on the layer on which the first electrode 710 is disposed, and is connected to the first electrode 710.

With such a structure, the switching TFT 10 is operated by a gate voltage applied to the gate line 151 so as to transfer a data voltage, applied to the data line 171, to the driving TFT 20. A voltage corresponding to the difference between a common voltage applied from the common power line 172 to the driving TFT 20 and the data voltage transferred from the switching TFT 10 is stored in the storage capacitor 80, and a current corresponding to the voltage stored in the storage capacitor 80 flows to the organic light emitting element 130 via the driving TFT 20, making the organic light emitting element 130 emit light.

As shown in FIGS. 1 and 3, the encapsulation layer 140, which is an encapsulator for encapsulating the organic light emitting element 130 on the substrate 110, may include one or more organic layers and one or more inorganic layers.

The touch panel 200 is placed on the encapsulation layer 140.

The touch panel 200 may be a capacitive touch panel 200 or a resistive touch panel, and detects a user's touch operation with respect to the display device 1001.

The optical unit 400 is disposed on the touch panel 200 disposed on the display panel 100, with the adhesive layer 300 interposed therebetween.

Figure 4:
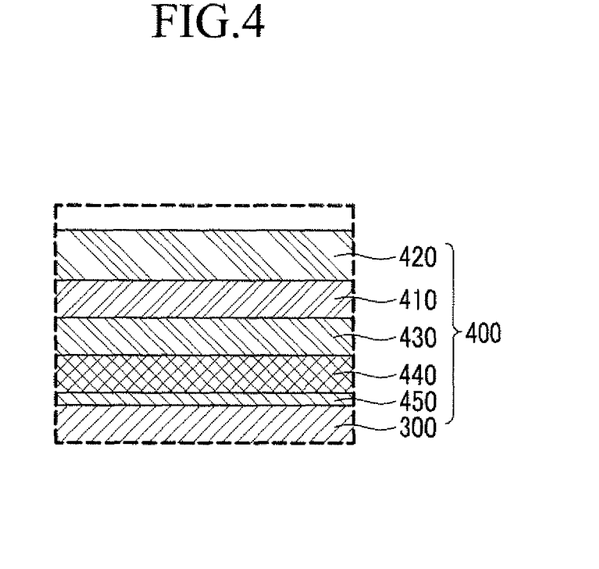
FIG. 4 is an enlarged cross-sectional view of a portion 'A' in FIG. 1.

FIG. 4 is an enlarged cross-sectional view of a portion 'A' in FIG. 1.

As illustrated in FIGS. 1 and 4, the optical unit 400 serves to restrain reflection of external light by the touch panel 200, a configuration for detecting reflection of external light by the display panel 100 that outputs light and a touch operation to thus minimize a loss of light emitted to the outside from the organic light emitting element 130 while improving overall visibility of the display device 1000. Also, the optical unit 400 serves to prevent a wiring of a pad or a wiring such as a driving unit, or the like, which may be disposed in the non-display area PA adjacent to the display area DA displaying an image, from being visible to the outside. The optical unit 400, having the form of a film, includes a polarizing plate 410, a first protective layer 420, a second protective layer 430, and a phase retardation plate 440, and a decoration layer 450.

The polarizing plate 410 is disposed on the display panel 100 which includes the organic light emitting element 130 for outputting light, and is positioned so as to correspond to the display area DA and the non-display area PA. The polarizing plate 410 includes a polarization axis and linearly polarizes light, passing through the polarizing plate 410, in the direction of the polarization axis. In detail, the polarizing plate 410 allows light consistent with the polarization axis to pass therethrough, and absorbs light not consistent with the polarization axis. Thus, when light passes through the polarizing plate 410, it is linearly polarized in the direction of the polarization axis.

The polarizing plate 410 may have a matrix structure. Specifically, the polarizing plate 410 includes a matrix, iodine, pigment, and the like. Here, the matrix may have a structure made of polyvinylalcohol (PVA).

The polarizing plate 410 simultaneously includes iodine, pigment, PVA, and the like, and here, the concentration of one or more of the iodine, pigment, PVA, and the like may be lowered to enhance transmittance of the polarizing plate 410 and lower the degree of polarization.

Meanwhile, when the polarizing plate is formed by including only iodine in the PVA, iodine ion chains are oriented by oriented PVA chains, causing the polarizing plate to have polarization. In this manner, when PVA includes only iodine, the polarization efficiency and transmittance of the polarizing plate can be enhanced, but durability over temperature and humidity and light is degraded due to sublimation of iodine so as to result in degradation of the polarizing plate. Thus, when the polarizing plate is formed by including only pigment in PVA, pigment is oriented by the oriented PVA chains, making the polarizing plate have polarization. However, when PVA includes only pigment, durability of the polarizing plate may be enhanced because pigment does not have sublimation such as that of iodine, but dichromatism of the polarizing plate may be degraded. Thus, in the polarizing plate 410 including PVA having both iodine having excellent uniformity and the pigment having excellent durability, the insufficient uniformity of iodine is complemented by the pigment, thus enhancing uniformity.

The polarizing plate 410 includes an absorption axis and a polarization axis. The absorption axis is an axis to which iodine ion chains and pigment ion chains are oriented, and when one of two vertical components of light oscillating in a certain direction interacts with electrons of the polarizing plate 410 and electrical energy of light is changed into electron energy thereby, the one component is cranked down. The polarization axis is perpendicular to the absorption axis, allowing light oscillating in the direction of the polarization axis to be transmitted therethrough.

The polarizing plate 410 may be fabricated by a method of stretching a PVA film and attaching iodine and pigment thereto, a method of adsorbing iodine and pigment to the PVA film and stretching the same, and a method of dyeing iodine and pigment to the PVA film and simultaneously stretching the same. The weight ratio of the iodine and pigment used in the polarizing plate 410 may range from 1:1 to 1:2. When the weight ratio of the iodine and pigment satisfies that range, the uniformity and polarization degree of the polarizing plate 410 are not degraded but enhanced.

The first protective layer 420 and the second protective layer 430 are disposed on upper and lower surfaces of the polarizing plate 410 with the polarizing plate 410 interposed therebetween, and they protect and support the polarizing plate 410 which is thin and has a weak strength as it is stretched. The first protective layer 420 and the second protective layer 430 may include a TAC resin, respectively. A hard coating layer may be disposed on the first protective layer 420 in order to prevent damage to the optical unit 400.

The phase retardation plate 440 retards the phase of light passing therethrough by $\lambda/4$, and converts linearly polarized light that passes therethrough into circularly polarized light, and converts circularly polarized light that passes therethrough into linearly polarized light.

In this manner, the phase retardation plate 440 and the polarizing plate 410 are sequentially stacked on the display panel, thus restraining reflection of external light made incident to the display device 1001. This will be described in detail hereinafter.

To begin with, as external light in which various phases are mixed passes through the polarizing plate 410, it is converted into linearly polarized light having a first linear polarization light axis, and as the linearly polarized light passes through the phase regardation plate 440, it is converted into circularly polarized light having a first circular polarization light axis.

As the circularly polarized light is reflected by the touch panel 200 or the display panel 100, it is converted into circularly polarized light having a second circular polarization light axis which is in the opposite direction relative to that of the first circular polarization light axis. As the circularly polarized light, having the second circular polarization light axis upon having been reflected by the touch panel 200 or the display panel 100, passes through the phase retardation plate 400, it is converted into linearly polarized light having a second linear polarization light axis which is in the opposite direction relative to that of the first linear polarization light axis and is then absorbed by the polarizing plate 410.

Thus, although external light made incident to the display device 1001 is reflected by the touch panel 200 or the display panel 100, since it is absorbed by the polarizing plate 410, the quality of an image formed by light emitted by the organic light emitting element 130 of the display panel 100 can be prevented from being degraded by the reflection of external light. Specifically, overall display quality of the display device 1001 can be enhanced.

The decoration layer 450 is positioned adjacent to the polarizing plate 410 with the phase retardation plate 440 interposed therebetween.

The decoration layer 450 is positioned between the phase retardation plate 440 and the display panel 100 so as to correspond to the non-display area PA. The decoration layer 450 blocks external light made incident to the display device 1001 from the outside and light outputted from the organic light emitting element 130 correspondingly in the non-display area PA to prevent the pad, the wiring of the driving unit, or the like, positioned in the non-display area PA, from being visible to the outside. Also, the decoration layer 450 may include a pattern for decorating an outer area of the display panel 100 corresponding to the non-display area PA of the display panel 100.

The decoration layer 450 is positioned between the touch panel 200 and the polarizing plate 410 so as to thereby prevent the wiring, or the like, positioned in the non-display area PA of the display panel 100 and in an outer area of the touch panel 200 corresponding to the non-display area PA, from being visible to the outside. The decoration layer 450 may be formed on the phase retardation plate 440 by using deposition, sputtering, a spray method, a printing method, or the like.

As described above, in the display device 1001 according to the first embodiment of the present invention, since the optical unit 400 in the form of a film is positioned on the flexible display panel 100, and since the decoration layer 450 for blocking light in the non-display area PA of the display panel 100 is included in the optical unit 400, there is no need to additionally include a window on the optical unit 400. Thus, the overall thickness of the display device 1001 can be reduced, and the overall flexible characteristics of the display device 1001 can be enhanced by the display panel 100 having the flexible characteristics.

Also, in the display device 1001 according to the first embodiment of the present invention, since the optical unit 400 includes the decoration layer 450 for blocking light in the non-display area PA of the display panel 100, and since the optical unit 400 is positioned on the uppermost layer of the display device 1001, although external light made incident to the display device 1001 is reflected by the touch panel 200 or the display panel 100, it is absorbed by the polarizing plate 410, thereby restraining reflection of external light and preventing the wiring, or the like, of each of the display panel 100 and the touch panel 200, positioned in the outer area of the display device 1001 corresponding to the non-display area PA of the display panel 100, from being visible to the outside. Thus, the overall display quality of the display device 1001 can be enhanced.

A display device according to a second embodiment of the present invention will now be described with reference to FIGS. 5 and 6.

Figure 5:
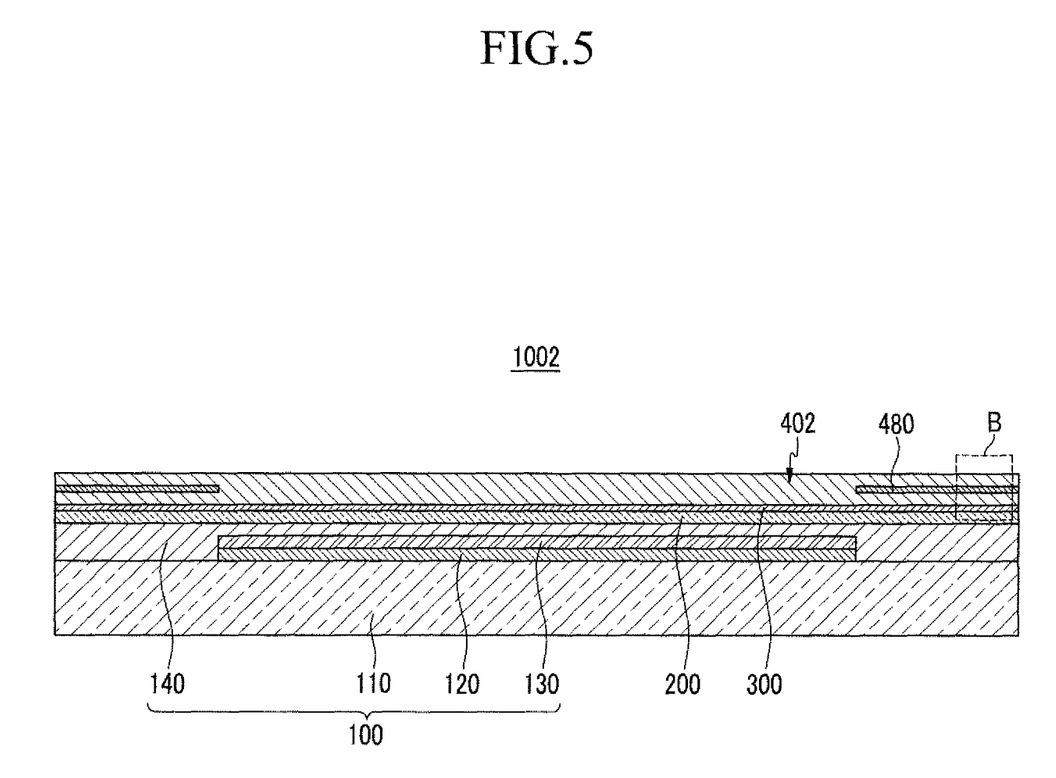
FIG. 5 is a cross-sectional view of a display device according to a second embodiment of the present invention.
Figure 6:
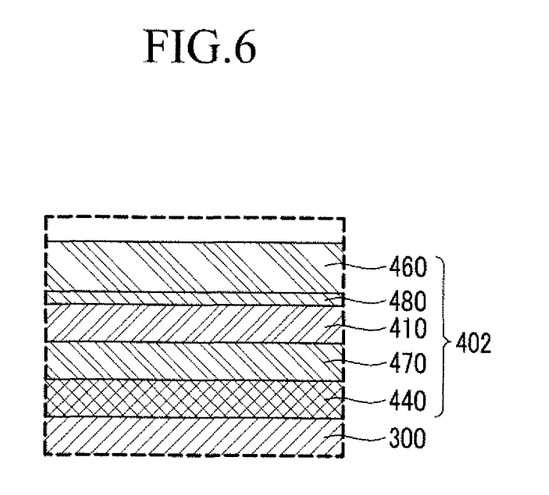
FIG. 6 is an enlarged cross-sectional view of a portion 'B' in FIG. 5.

FIG. 5 is a cross-sectional view of a display device according to a second embodiment of the present invention, and FIG. 6 is an enlarged cross-sectional view of a portion 'B' in FIG. 5.

Hereinafter, only the characteristics parts different from the first embodiment will be described, and parts which are not described will follow the first embodiment. In the second embodiment of the present invention, the same reference numerals as those of the first embodiment of the present invention will be used for the same elements.

As shown in FIGS. 5 and 6, in the display unit 1002 an optical unit 402 has the form of a film and includes a polarizing plate 410, a third protective layer 460, a fourth protective layer 470, a phase retardation plate 440, and a decoration layer 480.

The decoration layer 480 is adjacent to the polarizing plate 410 and is positioned between the third protective layer 460 and the polarizing plate 410. The decoration layer 480 is positioned between the third protective layer 460 and the polarizing plate 410 so as to correspond to the non-display area PA in order to block external light made incident to the display device 1002 from the outside and light passing through the phase retardation plate 440 and the polarizing plate 410 after being outputted from the organic light emitting element 130 of the display panel 100, thereby preventing the pad, the wiring of the driving unit, or the like, positioned in the non-display area PA, from being visible to the outside. In particular, since the decoration layer 480 is positioned on the phase retardation plate 440 and the polarizing plate 410 implementing an optical function, a decoration function including the function of blocking light and an adornment function can be enhanced in comparison to the first embodiment. The decoration layer 480 may be formed on the third protective layer 460 by using deposition, sputtering, a spray method, a printing method, or the like.

Since the decoration layer 480 is positioned on the uppermost layer among the layers substantially implementing the optical function included in the optical unit 402, the wiring or the like, positioned in the non-display area PA of the display panel 100 and an outer area of the touch panel 200 corresponding to the non-display area PA, can be prevented from being visible to the outside. In addition, blurs or the like, that may be generated from an outer area of each of the polarizing plate 410 and the phase retardation plate 440 corresponding to the non-display area PA, can be prevented from being visible to the outside.

As described above, in the display device 1002 according to the second embodiment of the present invention, since the optical unit 402 in the form of a film is positioned on the flexible display panel 100, and since the decoration layer 480 for blocking light in the non-display area PA of the display panel 100 is included on the uppermost layer of the optical unit 402, there is no need to additionally include a window on the optical unit 400. Thus, the overall thickness of the display device 1002 can be reduced, and the overall flexible characteristics of the display device 1002 can be enhanced by the display panel 100 having the flexible characteristics.

Also, in the display device 1002 according to the second embodiment of the present invention, since the optical unit 402 includes the decoration layer 480 for blocking light in the non-display area PA of the display panel 100 and substantially positioned on the uppermost layer of the optical unit 402, and since the decoration layer 480 is positioned on the uppermost layer of the display device 1002, although external light made incident to the display device 1002 is reflected by the touch panel 200 or the display panel 100, it is absorbed by the polarizing plate 410, thereby restraining reflection of external light and preventing the wiring, or the like, of each of the display panel 100 and the touch panel 200, positioned in the outer area of the display device 1002 corresponding to the non-display area PA of the display panel 100, from being visible to the outside. Thus, the overall display quality of the display device 1002 can be enhanced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An optical unit positioned on a display panel including a display area having a plurality of pixels for displaying an image and a non-display area adjacent to outermost edges of the display area, said optical unit comprising:
   an adhesive layer formed on the display layer above the display area and the non-display area;
   a polarizing plate positioned above the display panel so as to correspond to the display area and the non-display area, and polarizing light passing therethrough; and
   a decoration layer positioned adjacent to the polarizing plate above only the non-display area, and blocking light.

2. The optical unit of claim 1, wherein the decoration layer is positioned between the polarizing plate and the display panel.

3. The optical unit of claim 2, further comprising a phase retardation plate positioned between the polarizing plate and the decoration layer.

4. The optical unit of claim 3, wherein the polarizing plate linearly polarizes light and the phase retardation plate retards the phase of light by $\lambda/4$.

5. The optical unit of claim 3, wherein the decoration layer is formed on the phase retardation plate.

6. The optical unit of claim 1, further comprising a protective layer positioned on the polarizing plate;
   wherein the decoration layer is positioned between the protective layer and the polarizing plate.

7. The optical unit of claim 6, wherein the decoration layer is formed on the protective layer.

8. The optical unit of claim 6, further comprising a phase retardation plate positioned between the polarizing plate and the display panel.

9. A display device comprising the optical unit of claim 1, said optical unit having a form of a film;
   said display device further comprising a flexible display panel including the display area for displaying the image and the non-display area adjacent to the display area.

10. The display device of claim 9, further comprising a touch panel positioned between the flexible display panel and the optical unit.

11. The display device of claim 9, wherein the flexible display panel comprises an organic light emitting element.

12. An optical unit positioned on a display panel including a display area having a plurality of pixels for displaying an image and a non-display area adjacent to outermost edges of the display area, said optical unit comprising:
    an adhesive layer formed on the display layer above the display area and the non-display area;
    a polarizing plate positioned above the display panel so as to correspond to the display area and the non-display area, and polarizing light passing therethrough;
    a first protective layer positioned above the polarizing plate, and a second protective layer positioned below the polarizing plate; and
    a decoration layer formed above only the non-display area for blocking light.

13. The optical unit of claim 12, further comprising a phase retardation plate positioned between the polarizing plate and the display panel.

14. The optical unit of claim 13, wherein the polarizing plate linearly polarizes light and the phase retardation plate retards the phase of light by $\lambda/4$.

15. The optical unit of claim 13, further comprising the decoration layer formed directly on the adhesive layer.

16. The optical unit of claim 13, wherein the decoration layer is positioned between the first protective layer and the polarizing plate.

17. A display device comprising the optical unit of claim 12, said optical unit having a form of a film;
    said display device further comprising a flexible display panel including the display area for displaying the image and the non-display area adjacent to the display area.

18. The display device of claim 17, further comprising a touch panel positioned between the flexible display panel and the optical unit.

19. The display device of claim 17, wherein the flexible display panel comprises an organic light emitting element.

20. The display device of claim 17, wherein the display device includes an organic light emitting element.

* * * * *